United States Patent
Chiba et al.

(10) Patent No.: US 8,605,140 B2
(45) Date of Patent: Dec. 10, 2013

(54) SHUTTER GLASSES AND SHUTTER CONTROL METHOD

(75) Inventors: Atsuhiro Chiba, Tokyo (JP); Isao Ohashi, Kanagawa (JP); Tsutomu Nigami, Tokyo (JP); Kazunari Yoshifuji, Tokyo (JP)

(73) Assignee: Sony Corporation, Tokyo (JP)

( * ) Notice: Subject to any disclaimer, the term of this patent is extended or adjusted under 35 U.S.C. 154(b) by 438 days.

(21) Appl. No.: 12/801,818

(22) Filed: Jun. 28, 2010

(65) Prior Publication Data

US 2011/0037837 A1    Feb. 17, 2011

(30) Foreign Application Priority Data

Aug. 12, 2009  (JP) ................................. 2009-187045

(51) Int. Cl.
*H04N 9/47* (2006.01)

(52) U.S. Cl.
USPC ......................................................... 348/53

(58) Field of Classification Search
USPC ......... 348/53, E13.036, E13.038; 349/13, 15, 349/462, 464
See application file for complete search history.

(56) References Cited

U.S. PATENT DOCUMENTS

| | | | |
|---|---|---|---|
| 5,764,363 A * | 6/1998 | Ooki et al. | 356/364 |
| 6,188,442 B1 | 2/2001 | Narayanaswami | |
| 2002/0044350 A1 | 4/2002 | Sato et al. | |
| 2007/0263003 A1 * | 11/2007 | Ko et al. | 345/502 |
| 2009/0066863 A1 * | 3/2009 | Chen | 349/13 |

FOREIGN PATENT DOCUMENTS

JP    10-039254    2/1998

OTHER PUBLICATIONS

Extended European Search Report issued Sep. 27, 2012 for corresponding European Application No. 10 00 7255.

* cited by examiner

*Primary Examiner* — Mehrdad Dastouri
*Assistant Examiner* — Jared Walker
(74) *Attorney, Agent, or Firm* — Rader, Fishman & Grauer PLLC

(57) ABSTRACT

Shutter glasses for allowing a user to perceive 3D video includes: a shutter for a right eye and a shutter for a left eye performing open and close operations of shutters in accordance with a timing signal synchronized with 2D video displayed on a display; a detection means for detecting light intensity of linear polarized light; and a shutter control means for controlling ON/OFF for driving the shutter for the right eye and the shutter for the left eye in accordance with the detected light intensity of the linear polarized light.

11 Claims, 7 Drawing Sheets

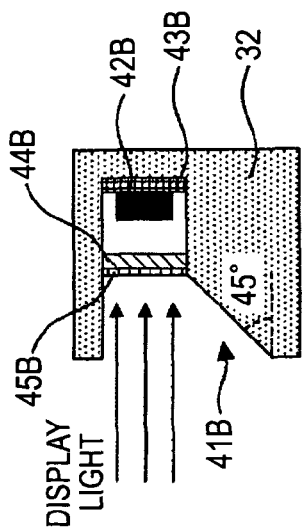
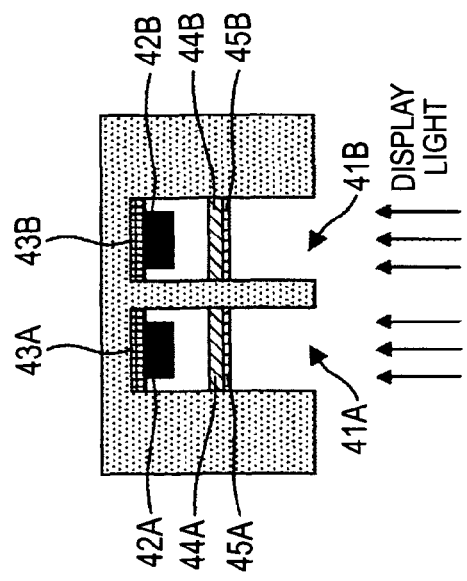
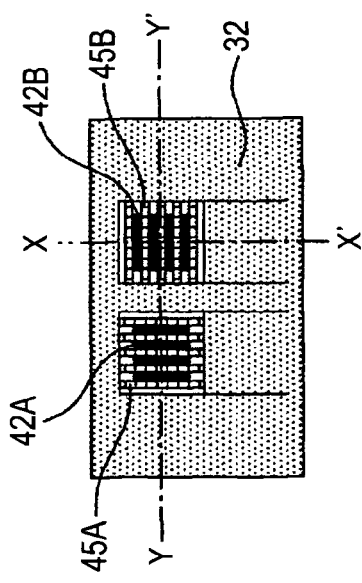

DISPLAY LIGHT

DISPLAY LIGHT

SHUTTER GLASSES AND SHUTTER CONTROL METHOD

BACKGROUND OF THE INVENTION

1. Field of the Invention

The invention relates to shutter glasses and a shutter control method, and particularly relates to shutter glasses and a shutter control method capable of reducing darkness of visual range obtained when seeing space outside a display screen of a display during viewing 3D video.

2. Description of the Related Art

In recent years, 3D video contents in which video can be viewed in a three-dimensional manner attract attention. As a system for viewing 3D video, two types of systems can be cited, which are a glasses system using polarizing filter glasses or shutter glasses, and a naked eye system not using glasses, such as for example, a lenticular system and a parallax barrier system.

FIG. 1 is a view showing perception principle of 3D video according to the system using shutter glasses.

On a display 1, video for a left eye and video for a right eye are alternately displayed in order of, for example, a video for the left eye L1, a video for the right eye R1, a video for the left eye L2, a video for the right eye R2, a video for the left eye L3 and a video for the right eye R3 . . . in time series.

On the other hand, a user who views 3D video wears shutter glasses 2. A timing signal for timing of opening and closing shutters is supplied to the shutter glasses 2. The shutter glasses 2 control open and close of a shutter for a left eye and a shutter for a right eye in accordance with the timing signal. Specifically, the shutter glasses 2 repeat open and close operations of two shutters, which are a shutter open operation for the left eye as well as a shutter open operation for the right eye and a shutter close operation for the left eye and a shutter close operation for the right eye alternately so that they are synchronized with the timing signal. As a result, only video for the right eye is inputted to the right eye of the user and only video for the left eye is inputted to the left eye. Parallax is provided in the video for the left eye and the video for the right eye, and the user can perceive 3D video due to the parallax included in 2D video.

The above system is also called a shutter glasses system or an active stereo system. For transmission/reception of the timing signal, an infrared communication is applied, and a transmitter for an infrared signal is mounted on the display side and a receiver for the infrared signal is mounted on the shutter glasses 2 side.

As it is necessary to display the video for the left eye and the video for the right eye in time series in the shutter glasses system, a high display speed (display rate) is necessary. Accordingly, a CRT (Cathode Ray Tube) display has been used as the display 1 in related art, however, a flat-panel display such as a plasma display or a liquid crystal display can also realize the system. In the light of a popularization rate of the flat-panel display in recent years, it is presumable that viewing in the liquid crystal display will be the mainstream also in the viewing 3D video contents from now.

As shutters for the shutter glasses, shutters applying liquid crystal shutters are common. The liquid crystal shutters have a structure in which polarizing plates overlap each other on both outer surfaces of glass substrates into which liquid crystal is sealed.

When the user views 3D video by the shutter glasses system, not only 3D video displayed on the display but also objects, landscapes and so on around the display come into sight of the user.

When the user sees objects or landscapes around the display through the liquid crystal shutters, light incident on the liquid crystal shutters (incident light) is non-polarized natural light. At this time, light passing through the liquid crystal shutters will be approximately half (approximately 50%) as much as light before incidence by the polarizing plates in principle, and further, the light will be reduced to approximately 30% due to absorption and dispersion of light by the liquid crystal and the polarizing plates. As described above, due to open and close operations of shutters either of the shutter for the left eye and the shutter for the right eye is inevitably in a closed state, therefore, the light will be further half of approximately 30% as both eyes. That is, light transmittance in the case that the user sees objects or landscapes around the display through the liquid crystal shutters will be approximately 15%.

On the other hand, light emitted from the liquid crystal display (display light) is linear polarized light. Therefore, display light in the case that the user sees 3D video displayed on the liquid crystal display will be linear polarized light. When a polarization axis of the liquid crystal shutters corresponds to the direction of linear polarized light of display light, there is no effect by the polarizing plates described above, therefore, light incident on both eyes of the user will be twice as much as light in the case of the above natural light. That is, light transmittance in the case that the user sees 3D video displayed on the liquid crystal display through the liquid crystal shutters will be approximately 30%.

Therefore, when the polarization axis of the liquid crystal shutters of the shutter glasses corresponds to the direction of linear polarized light of the liquid crystal display, only the display screen of the liquid crystal display is seen bright and the periphery of the display screen of the liquid crystal display is seen dark. As a result, for example, when the user operates a remote controller held in hand, when the user browses a program schedule of a newspaper or when the user turns sideways and has a conversation with a person next to the user during viewing of 3D video, the user feels extremely dark in visual range, therefore, the user may remove the shutter glasses at these situation.

In view of the above, it is proposed stereo glasses in which a rotational portion rotating a filter corresponding to a shutter and a weight portion are provided at a glasses frame (for example, refer to JP-A-10-39254 (Patent Document 1). According to the stereo glasses, the weight portion allows the rotation portion to rotate by inclination of the glasses frame to thereby rotate the filter, as a result, observation is possible without through the filter.

SUMMARY OF THE INVENTION

However, in the method proposed in Patent Document 1, the mechanism of the glasses is complicated and the weight is heavy, moreover, it is necessary to incline the head to some degree or more for obtaining a sufficiently bright visual field, which is detrimental to user friendliness. Additionally, the filter moves only when the head is inclined downward, therefore, there is a problem that the filter does not move when the head turns sideways with respect to the display.

In the above document, a method of arranging filters at only an upper region of the glasses frame is also proposed, however, a viewing angle in which 3D video can be viewed is narrowed by the method as well as, when the user desired to view the video without through the filter, the user have to see hands by casting a glance downward without inclining the head, therefore, the eyes will get tired.

Thus, it is desirable to reduce darkness in visual range obtained when seeing space outside the display screen of the display during viewing of 3D video.

According to an embodiment of the invention, there is provided shutter glasses for allowing a user to perceive 3D video including a shutter for a right eye and a shutter for a left eye performing open and close operations of shutters in accordance with a timing signal synchronized with 2D video displayed on a display, a detection means for detecting light intensity of linear polarized light and a shutter control means for controlling ON/OFF for driving the shutter for the right eye and the shutter for the left eye in accordance with the detected light intensity of the linear polarized light.

According to another embodiment of the invention, there is provided a shutter control method of shutter glasses for allowing a user to perceive 3D video, which have a shutter for a right eye and a shutter for a left eye performing open and close operations of shutters in accordance with a timing signal synchronized with 2D video displayed on a display. The method includes the steps of detecting intensity of linear polarized light and controlling ON/OFF for driving the shutter for the right eye and the shutter for the left eye in accordance with the detected intensity of the linear polarized light.

According to the embodiments of the invention, light intensity of the linear polarized light emitted from the display is detected and ON/OFF for driving the shutter for the right eye and the shutter for the left eye is controlled in accordance with the detected light intensity of the linear polarized light.

According to the embodiments of the invention, darkness in visual range obtained when seeing space outside the display screen of the display during viewing of 3D video can be reduced.

BRIEF DESCRIPTION OF THE DRAWINGS

FIGS. 4A to 4C are enlarged views in the vicinity of a display light detector of the shutter glasses;

DESCRIPTION OF THE PREFERRED EMBODIMENTS

Configuration Example of an Image Processing Apparatus

Figure 2:
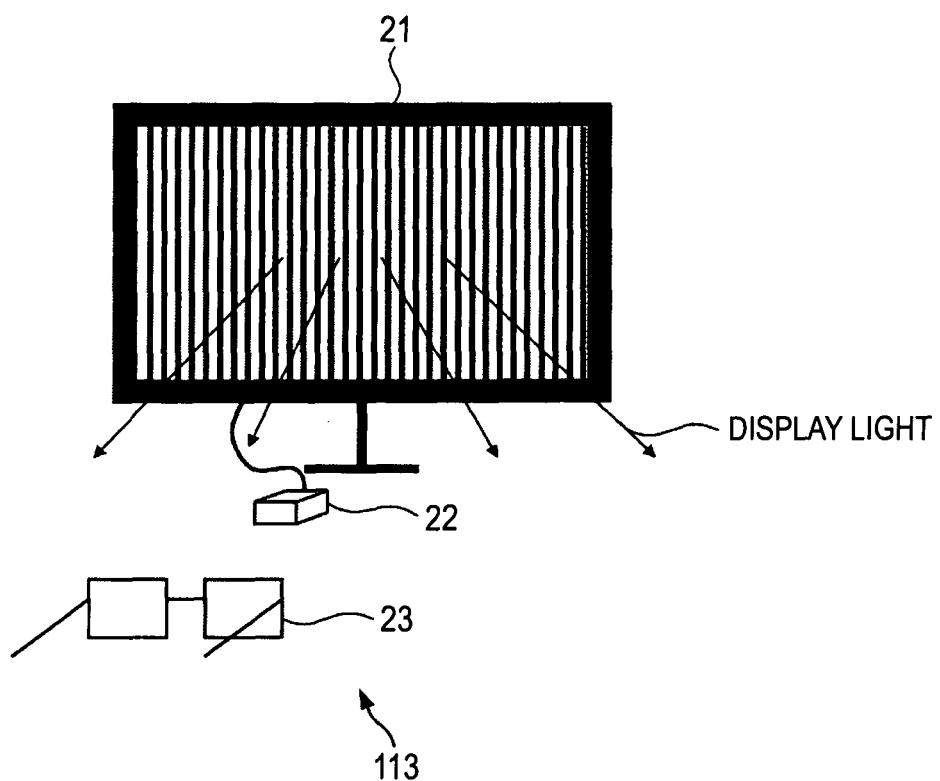
FIG. 2 is a block diagram showing a configuration example of a 3D video viewing system to which an embodiment of the invention is applied.

FIG. 2 shows a configuration example of a 3D video viewing system to which the invention is applied.

A 3D video viewing system 11 in FIG. 2 is a system for viewing 3D video by a glasses system using shutter glasses. The 3D video viewing system 11 includes a liquid crystal display 21 displaying 3D video, a transmitting device 22 transmitting a timing signal and shutter glasses 23.

The liquid crystal display 21 displays 2D video for allowing the user to perceive 3D video based on 3D video data. The 3D video data can be acquired by, for example, receiving a broadcasting signal by the liquid crystal display 21 or receiving a video signal played back in a recording/playback apparatus.

Figure 1:
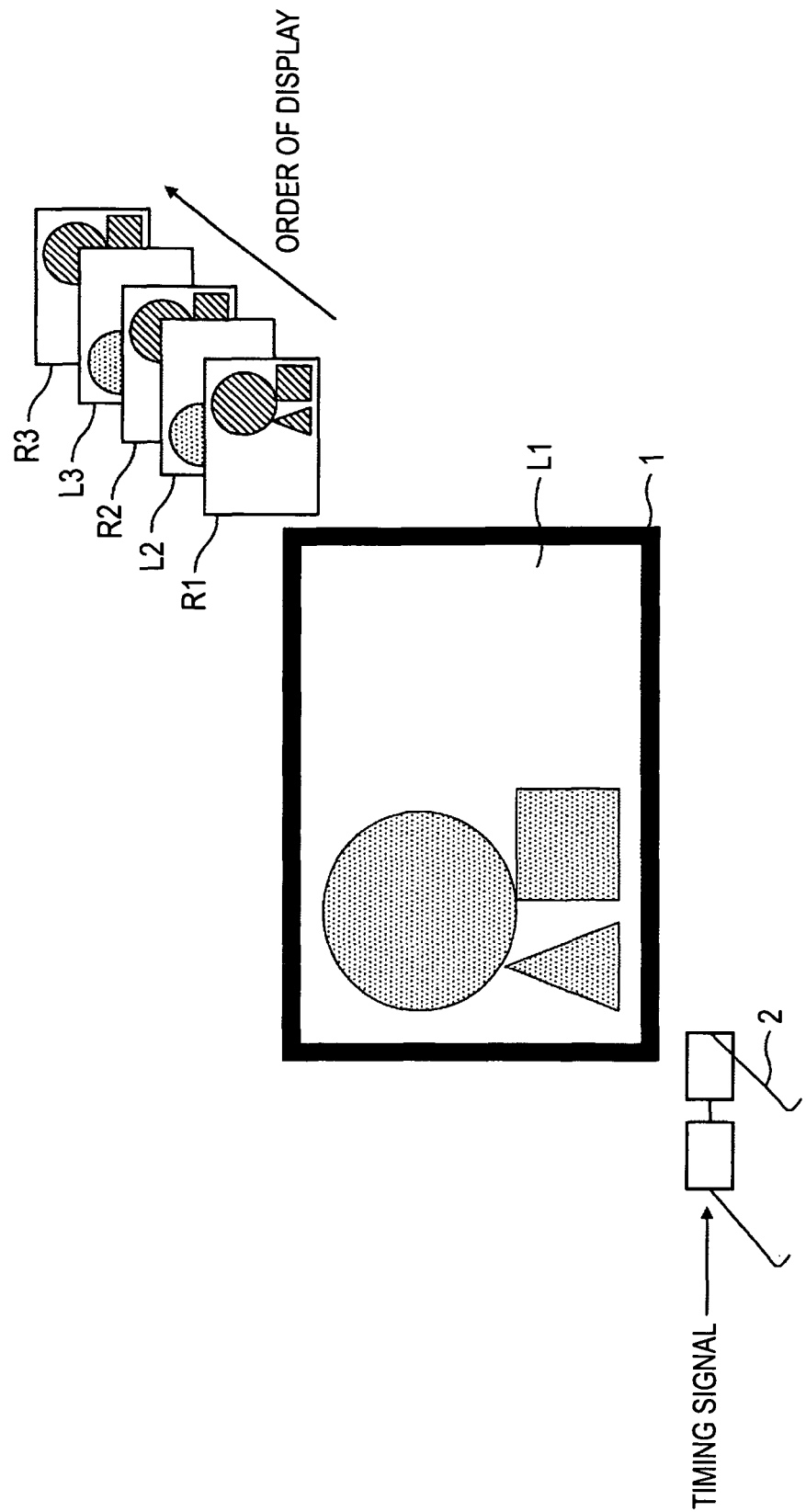
FIG. 1 is a view showing perception principle of 3D video according to a system using shutter glasses.

The 2D video displayed by the liquid crystal display 21 includes video for the left eye and video for the right eye as described with reference to FIG. 1, and the video for the left eye and video for the right eye are alternately displayed in the liquid crystal display 21. The parallax is provided in the video for the left eye and video for the right eye. In the present specification, 2D video indicates 2D video for allowing the user to perceive 3D video.

Light of 2D video emitted from a display screen of the liquid crystal display 21 (referred to as display light in the following description) will be linear polarized light due to a configuration of a liquid crystal panel.

Here, the configuration of the liquid crystal panel will be briefly explained. The liquid crystal panel includes a configuration in which a liquid crystal layer is sandwiched between two thin glass substrates. On a surface of the glass substrate, an alignment layer for twisting liquid crystal molecules in a particular form, transparent electrodes for controlling orientation of liquid crystal molecules by applying voltage to the liquid crystal layer and color filters enabling color display and the like are formed. Polarizing plates are adhered to the reverse and the surface of the liquid crystal panel.

At the back face side of the liquid crystal panel which is the opposite side of a face seen by the user, backlights are arranged. Light of the backlights is natural light a vibration surface of which is irregular and vibrate in various directions. In these light, only light (polarized light) having a vibration component of a first direction (for example, a horizontal direction) transmits through the reverse polarizing plate and is incident on the liquid crystal layer. While the light propagates in the thickness direction of the liquid crystal layer, the polarization state varies in a second direction (for example, a vertical direction) in accordance with refractive index anisotropy of the liquid crystal. In light emitted from the liquid crystal, only polarized light transmitting through the polarizing plate on the surface wide is emitted as display light. As a result, light emitted from the liquid crystal display 21 to reach the eyes of the user will be linear polarized light.

In the embodiment, explanation will be made under a condition that the polarized direction of display light is the vertical direction (lengthwise direction) as shown in FIG. 2, however, it is not limited to this.

The transmitting device 22 generates a timing signal synchronized with 2D video displayed on the liquid crystal display 21. The transmitting device 22 transmits the generated timing signal to the shutter glasses 23 by wireless communication such as infrared communication and RF (Radio Frequency) communication. The transmitting device 22 is incorporated as part of the liquid crystal display 21 to be united to each other.

The shutter glasses 23 include a function as a receiving device and receive the timing signal transmitted from the transmitting device 22 by wireless communication. The shutter glasses 23 drive the liquid crystal shutters based on the received timing signal in the same manner as the shutter glasses 2 of FIG. 1. That is, the shutter glasses 23 repeat open and close operations of two shutters, which are a shutter open operation for the left eye as well as a shutter open operation for the right eye and a shutter close operation for the left eye and a shutter close operation for the right eye alternately so that they are synchronized with the timing signal. The liquid crystal shutter for the left eye or the liquid crystal shutter for the right eye is controlled based on the timing signal, therefore, only video for the right eye is inputted to the right eye and only video for the left eye is inputted to the left eye of the user. As a result, the user wearing the shutter glasses 23 can perceive 2D video displayed on the liquid crystal display 21 as 3D video.

[Configuration of the Shutter Glasses 23]

Figure 3:
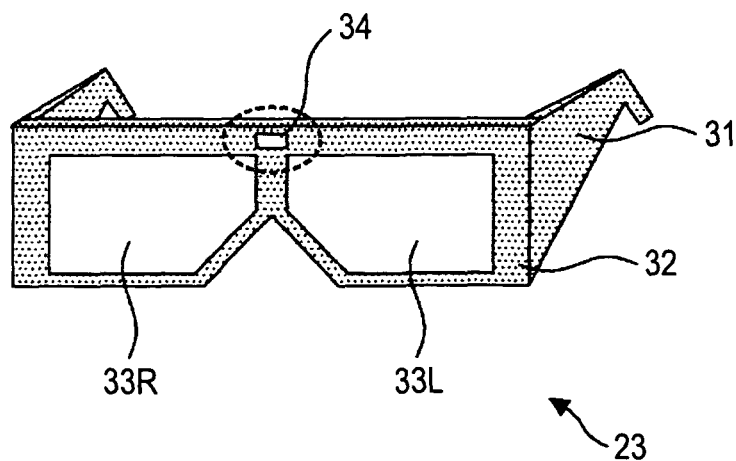
FIG. 3 is a perspective view showing a configuration of the shutter glasses.

FIG. 3 is a perspective view showing a configuration of shutter glasses 23 of FIG. 2.

The basic shape of the shutter glasses 23 is the same as common glasses. Inside temples 31 and a frame 32 of the shutter glasses 23, a control circuit for driving a shutter for the right eye 33R and a shutter for the left eye 33L and a small battery as a power source are included. At the front center portion of the frame 32, a display light detector 34 is provided.

FIGS. 4A to 4C are enlarged views in the vicinity of the display light detector 34 of the shutter glasses 23 indicated by a dotted line in FIG. 3.

FIG. 4A is a front elevational view of the vicinity of the display light detector 34 of the shutter glasses 23 seen from the front, FIG. 4B is a side elevational view of a section taken along the line X-X' of FIG. 4A seen from the side and FIG. 4C is an upper surface view of a section taken along the line Y-Y' of FIG. 4A seen from the upper surface.

As shown in FIG. 4C, two accommodation portions 41A, 41B formed by hollowing the frame 32 inside are provided side by side in the lateral direction.

In the accommodation portion 41A, a photosensor 42A outputting an electrical signal in proportion to the intensity of received light, a processing substrate 43A processing the electrical signal and a polarizing filter 45A adhered to a transparent incident window 44A are arranged.

In the other accommodation portion 41B, a photosensor 42B, a processing substrate 43B processing the electrical signal and a polarizing filter 45B adhered to a transparent incident window 44B are arranged.

The photosensors 42A, 42B are the same type of sensors having sensitivity with respect to visible light and having equivalent electrical characteristics. Each photosensor includes, for example, a photodiode, a phototransistor and a photo IC. The processing substrates 43A, 43B are the same type of substrates performing signal processing.

The polarizing filters 45A, 45B are adhered to the incident window 44A or 44B so that the polarized directions of which are orthogonal to each other. That is, a transmission axis of the polarizing filter 45A is in the vertical direction which is parallel to (the same direction as) the polarized direction of display light emitted from the liquid crystal display 21 as shown in FIG. 4A. On the other hand, a transmission axis of the polarizing filter 45B is in the horizontal direction which is vertical to the polarized direction of display light emitted from the liquid crystal display 21.

The polarizing filter 45A and the incident window 44A transmit only linear polarized light in the vertical direction which is parallel to display light, and the transmitted linear polarized light is received by the photosensor 42A. The polarizing filter 45B and the incident window 44B transmit only linear polarized light in the horizontal direction which is vertical to display light, and the transmitted linear polarized light is received by the photosensor 42B.

Respective configurations of the accommodation portion 41A and the accommodation portion 41B only differ from each other in a point of the polarized direction of light to be received, therefore, when it is not necessary to definitely discriminate them in the following description, these components are merely referred to as the accommodation portion 41, the photosensor 42, the processing substrate 43, the incident window 44 and the polarizing filter 45.

Next, the shape of a portion of the accommodation portion 41 in front of the polarizing filter 45 will be explained.

As shown in FIG. 4B, an upper portion of the accommodation portion 41 in front of the polarizing filter 45 is a wall surface vertical to the surface of the polarizing filter 45 such as an eaves. A lower portion of the accommodation portion 41 in front of the polarizing filter 45 is an surface inclined downward at 45 degrees. Further, as shown in FIG. 4C, right and left portions of the accommodation portion 41 in front of the polarizing filter 45 are wall surfaces vertical to the polarizing filter 45.

In the case where the user wearing the shutter glasses 23 faces the front direction, namely, the direction of the liquid crystal display 21, display light emitted from the liquid crystal display 21 is incident on the surface of the polarizing filter 45 vertically as shown in FIG. 4B and FIG. 4C.

Figure 5A:
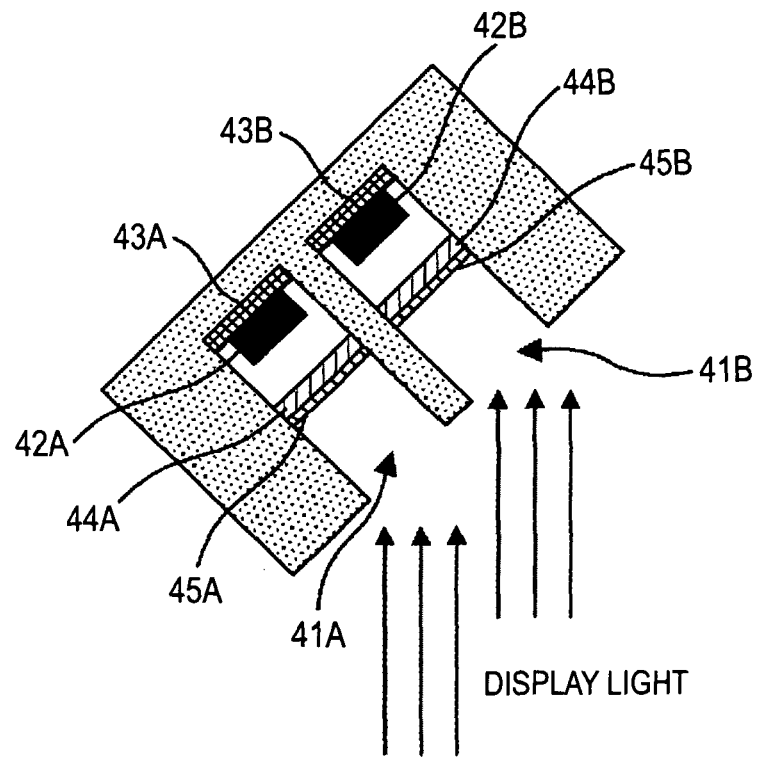
FIGS. 5A and 5B are enlarged views in the vicinity of the display light detector of the shutter glasses.

In the case where the user turns the head to right/left directions (horizontal direction) with respect to the liquid crystal display 21, when the inclination of the shutter glasses 23 is less than 90 degrees with respect to display light, the display light is directly incident on the polarizing filter 45 or incident on the polarizing filter 45 after being reflected on the right/left wall surfaces of the accommodation portion 41 as shown in FIG. 5A. On the other hand, when the inclination of the shutter glasses 23 in the right/left direction is 90 degrees or more with respect to display light, the display light is not incident on the polarizing filter 45.

Figure 5B:
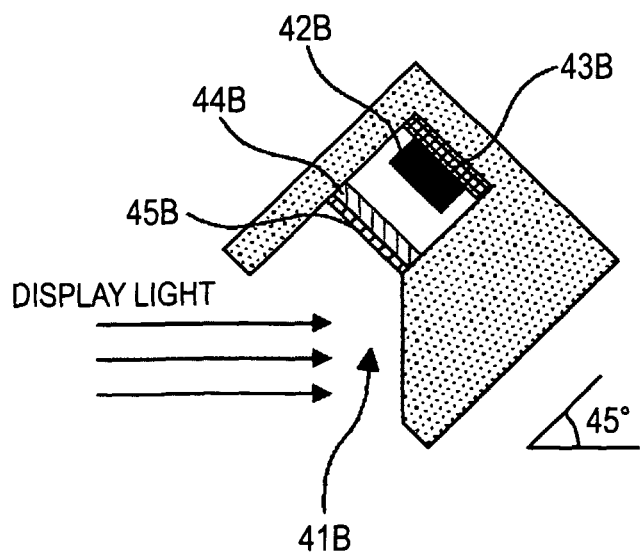

As shown in FIG. 5B, in the case where the user turns the head downward with respect to the liquid crystal display 21, when the inclination of the shutter glasses 23 in the vertical direction is less than 45 degrees with respect to display light, the display light is incident on the polarizing filter 45 directly or after being reflected on the inclined surface of the accommodation unit 41. On the other hand, when the inclination of the shutter glasses 23 in the vertical direction is 45 degrees or more with respect to display light, the display light is repelled at the eaves of the upper wall surface and is not incident on the polarizing filter 45.

Conversely, in the case where the user turns the head upward with respect to the liquid crystal display 21, when the inclination of the shutter glasses 23 in the vertical direction is less than 90 degrees with respect to display light, the display light is incident on the polarizing filter 45 directly or after being reflected on the eaves of the upper wall surface of the accommodation portion 41. When the inclination of the shutter glasses 23 in the vertical direction is 90 degrees or more with respect to display light, the display light is not incident on the polarizing filter 45.

Concerning the angle of the inclination surface of the accommodation portion 41 at the lower side in front of the polarizing filter 45, an appropriate value can be determined in accordance with a later described threshold as well as at which inclination the liquid crystal shutter is desired to be operated with respect to the liquid crystal display 21. It is the same also with respect to the length of the eaves of the accommodation portion 41 (depth from the surface of the frame 32 to the polarizing filter 45.

[Functional Block Diagram of the Shutter Glasses 23]

Figure 6:
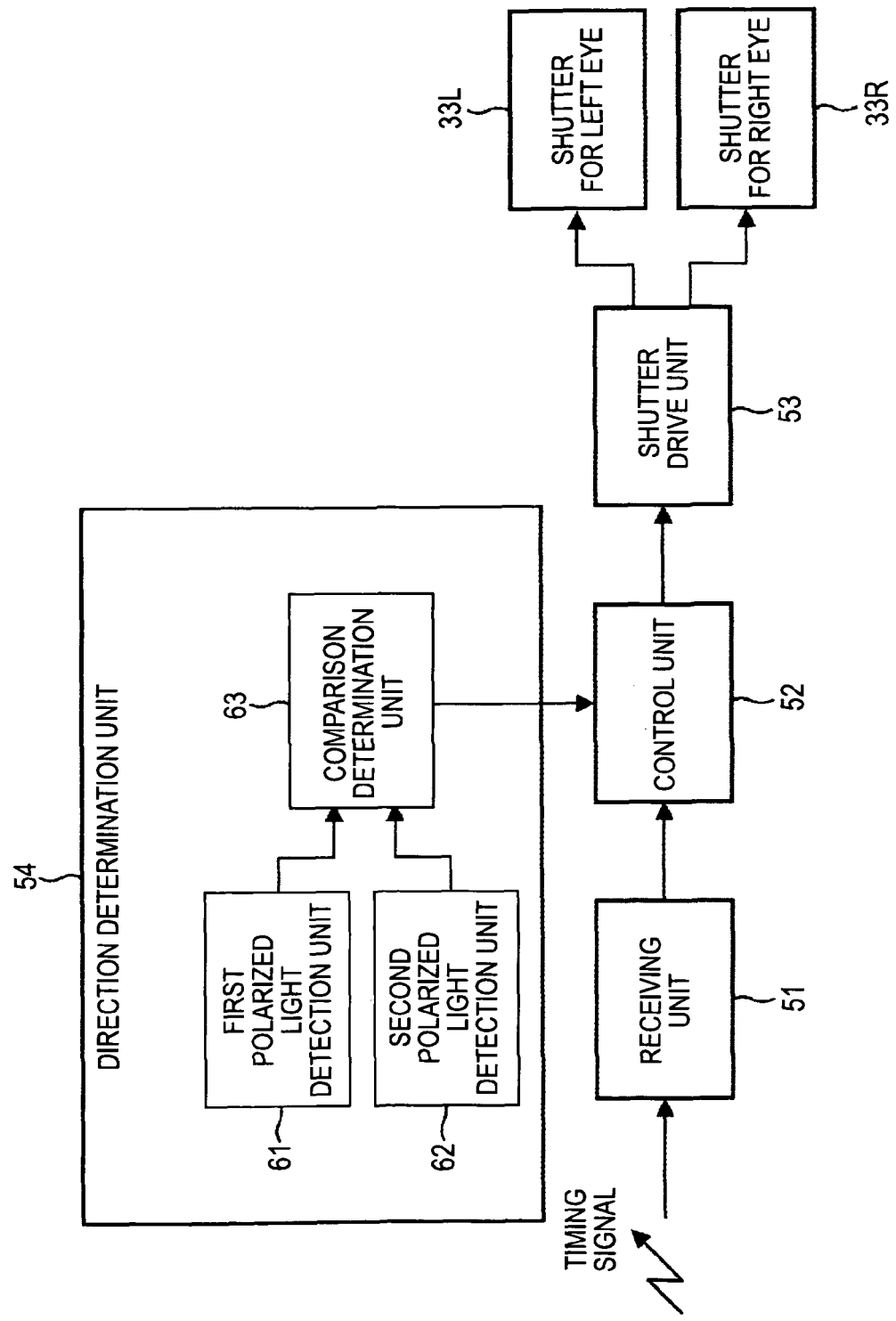
FIG. 6 is a functional block diagram concerning shutter control of the shutter glasses.

FIG. 6 shows a functional block diagram concerning shutter control of the shutter glasses 23.

The shutter glasses 23 include the shutter for the left eye 33L, the shutter for the right eye 33R, a receiving unit 51, a control unit 52, a shutter drive unit 53 and a direction determination unit 54. The shutter glasses 23 differ from common shutter glasses in a point that it has the direction determination unit 54.

The receiving unit 51 receives a timing signal transmitted from the transmitting device 22 by wireless communication and supplies the signal to the control unit 52. The receiving unit 51 includes, for example, an infrared communication module and the like.

To the control unit 52, an on/off signal indicating ON or OFF of shutter control is supplied from the direction determination unit 54, which is determined in accordance with orientations of the shutter glasses 23 with respect to the liquid crystal display 21. Specifically, when the shutter glasses 23 face the direction of the liquid crystal display 21, the on/off signal indicating ON of shutter control is supplied from the display determination unit 54. On the other hand, when the shutter glasses 23 do not face the direction of the liquid crystal display 21, the on/off signal indicating OFF of the shutter control is supplied from the direction determination unit 54.

The control unit 52 controls driving of the shutter for the left eye 33L and the shutter for the right eye 33R based on the on/off signal from the direction determination unit 54. That is, when the on/off signal indicating ON of shutter control is supplied from the direction determination unit 54, the control unit 52 generates a drive signal for driving the shutter for the left eye 33L and the shutter for the right eye 33R based on the timing signal supplied from the receiving unit 51 and supplies the signal to the shutter drive unit 53.

On the other hand, when the on/off signal indicating OFF of the shutter control is supplied from the direction determination unit 54, the control unit 52 does not supply the drive signal to the shutter drive unit 53.

When the drive signal is supplied from the control unit 52, the shutter drive unit 53 drives the shutter for the left eye 33L and the shutter for the right eye 33R based on the drive signal. That is, the shutter control unit 53 controls voltage to be applied to a first electrode and a second electrode facing with each other sandwiching the liquid crystal layer therebetween in each of the shutter for the left eye 33L and the shutter for the right eye 33R based on the drive signal.

The liquid crystal shutter is commonly driven by voltage of approximately ±10 to 20V. The shutter for the left eye 33L and the shutter for the right eye 33R are liquid crystal shutters called a normally white type. When the voltage difference between the first electrode and the second electrode is 0V, the shutters open and when the first electrode and the second electrode is ±15V, the shutters close. When the shutter for the left eye 33L and the shutter for the right eye 33R are not controlled at all, the voltage difference between the first electrode and the second electrode will be 0V, and both the shutter for the left eye 33L and the shutter for the right eye 33R are in the open state.

It is possible to apply a normally black type liquid crystal shutter in which the open/close state is opposite with respect to the same apply voltage.

The direction determination unit 54 includes a first polarized light detection unit 61, a second polarized light detection unit 62 and a comparison determination unit 63.

The first polarized light detection unit 61 corresponds to the photosensor 42A, the processing substrate 43A and the polarizing filter 45A, and the second polarized light detection unit 62 corresponds to the photosensor 42B, the processing substrate 43B and the polarizing filter 45B.

The polarizing filter 45A transmits only a polarized component parallel to the polarized direction of display light emitted from the liquid crystal display 21 as described above. Therefore, the first polarized light detection unit 61 detects light intensity of the polarized component parallel to the polarized direction of the display light and converts the light intensity into an electrical signal, then, supplies the signal to the comparison determination unit 63.

On the other hand, the polarizing filter 45B transmits only a polarized component vertical to the polarized direction of display light emitted from the liquid crystal display 21, therefore, the second polarized light detection unit 62 detects light intensity of the polarized component vertical to the polarized direction of the display light and converts the light intensity into an electrical signal, then, supplies the signal to the comparison determination unit 63.

The comparison determination unit 63 supplies the on/off signal indicating OFF of the shutter control or ON of the shutter control to the control unit 52 based on light intensity supplied from the first polarized light detection unit 61 and the second light detection unit 62. Specifically, when the difference of light intensities supplied from the first polarized light detection unit 61 and the second polarized light detection unit 62 is higher than a previously set threshold TH, the comparison determination unit 63 supplies the on/off signal indicating ON of shutter control to the control unit 52. On the other hand, the difference of light intensities of light intensities supplied from the first polarized light detection unit 61 and the second polarized light detection unit 62 is lower than the previously set threshold TH, the comparison determination unit 63 supplies the on/off signal indicating OFF of the shutter control to the control unit 52.

The relation between the direction of the shutter glasses 23 with respect to the liquid crystal display 21 and light intensities detected at the first polarized light detection unit 61 and the second polarized light detection unit 62 will be explained.

To the first polarized light detection unit 61 and the second polarized light detection unit 62, both display light emitted from the liquid crystal display 21 and other natural light including sunlight and illumination light such as fluorescent light and electric light are incident. Here, assume that a component of display light incident on the first polarized light detection unit 61 or the second polarized light detection unit 62 is "A" and a component of natural light is "B".

The natural light has the irregular vibration surface and vibrates in various directions, therefore, half of the natural light component B, namely, B/2 is detected both in the first polarized light detection unit 61 and the second polarized light detection unit 62 concerning natural light.

On the other hand, display light emitted from the liquid crystal display 21 is linear polarized light, and the polarized direction thereof is the same direction as the transmission axis of the polarizing filter 45A of the first polarized light detection unit 61 and is vertical to the transmission axis of the polarizing filter 45B of the second polarized light detection unit 62. Therefore, almost the whole component A of display light emitted from the liquid crystal display 21 can be detected in the first polarized light detection unit 61, and the component A of display light emitted from the liquid crystal display 21 is hardly detected in the second polarized light detection unit 62.

As a result, when the shutter glasses 23 face the direction of the liquid crystal display 21, light intensity of the sum (A+B/2) of the component A which is the display light emitted from the liquid crystal display 21 and the half of the natural light component B/2 is detected in the first polarized light detection unit 61. On the other hand, light intensity of only the half of the natural light component B/2 is detected in the second polarized light detection unit 62. Then, the difference of light intensities detected in the first polarized light detection unit 61 and the second polarized light detection unit 62 will be the component A={(A+B/2)−B/2} which is the display light emitted from the liquid crystal display 21.

On the other hand, when the shutter glasses 23 do not face the direction of the liquid crystal display 21, for example, when the user faces just sideways with respect to the liquid crystal display 21, the component A of display light emitted from the liquid crystal display 21 is not detected either in the first polarized light detection unit 61 and only the light intensity of the half of the natural light component B/2. In the second polarized light detection unit 62, only the light intensity of the half of the natural light component B/2 is detected in the same manner as in the case where the shutter glasses face the direction of the liquid crystal display 21. Therefore, the difference of light intensities detected in the first polarized light detection unit 61 and the second polarized light detection unit 62 will be almost 0={B/2-B/2}.

Accordingly, the difference of light intensities supplied from the first polarized light detection unit 61 and the second polarized light detection unit 62 is compared with the threshold TH, thereby determining whether the shutter glasses 23 face the direction of the liquid crystal display 21 or not, that is, whether the user faces the direction of the liquid crystal display 21 or not.

When the inclination of the shutter glasses 23 is small with respect to the liquid crystal display 21, display light is reflected on wall surfaces of up and down, right and left in front of the polarizing filter 45 in the accommodation portion 41 and incident on the polarizing filter 45 in some measure. Therefore, the range of inclination in which the shutter operation is allowed to be performed by the shutter glasses 23 can be controlled by values of the threshold TH.

[Shutter Control Processing of the Shutter Glasses 23]

Figure 7:
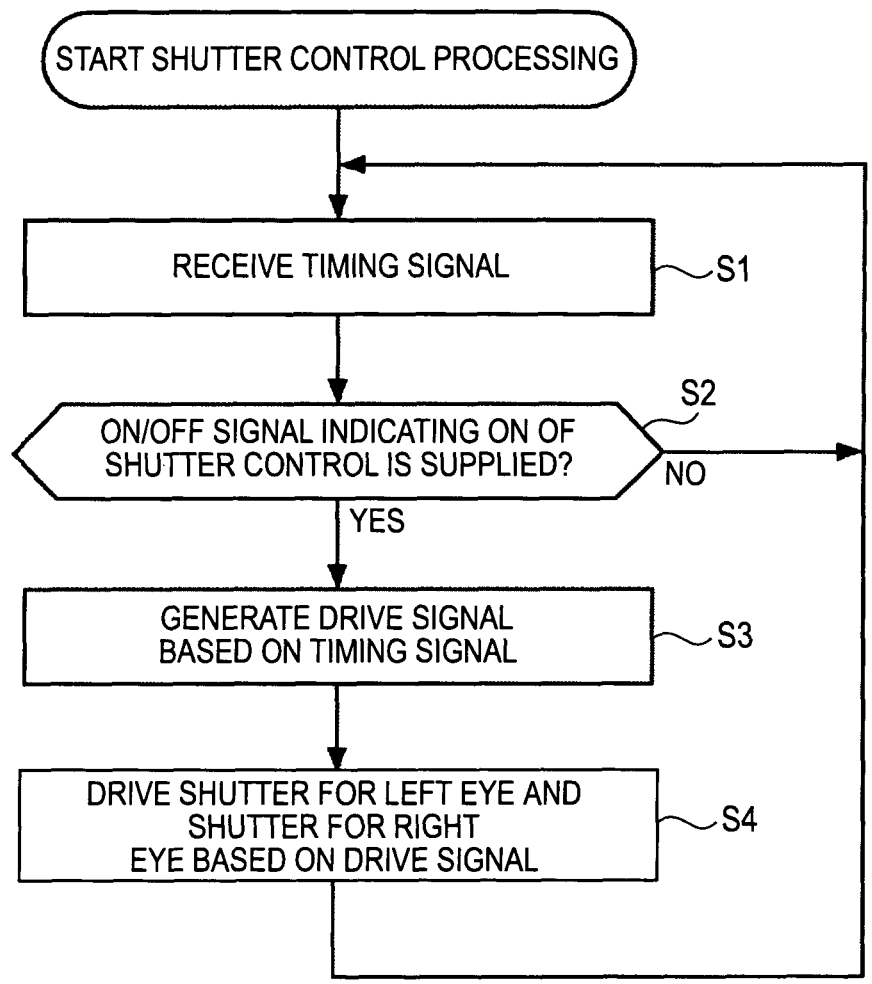
FIG. 7 is a flowchart for explaining shutter control processing.

Next, shutter control processing of the shutter glasses 23 will be explained with reference to a flowchart of FIG. 7. The processing is executed at least in a period during which the timing signal is supplied from the transmitting device 22.

First, the receiving unit 51 receives the timing signal transmitted from the transmitting device 22 by wireless communication and supplies the signal to the control unit 52 in Step S1.

In Step S2, the control unit 52 determines whether the on/off signal indicating ON of shutter control is supplied from the direction determination unit 54 or not.

When it is determined that the on/off signal indicating ON of shutter control is supplied from the direction determination unit 54 in Step S2, the processing proceeds to Step S3 and the control unit 52 generates a drive signal for driving the shutter for the left eye 33L and the shutter for the right eye 33R based on the timing signal supplied from the receiving unit 51, supplying the signal to the shutter control unit 53.

Further, in Step S4, the shutter drive unit 53 drives the shutter for the left eye 33L and the shutter for the right eye 33R based on the drive signal supplied from the control unit 52. That is, the shutter drive unit 53 opens the shutter for the left eye 33L as well as closes the shutter for the right eye 33R or the shutter drive unit 53 closes the shutter for the left eye 33L as well as opens the shutter for the right eye 33R based on the drive signal. After Step S4, the processing returns to Step S1.

On the other hand, when it is determined that the on/off signal indicating OFF of shutter control is supplied from the direction determination unit 54, the processing returns to Step S1 and processing after that is repeated.

[Direction Determination Processing of the Direction Determination Unit 54]

Figure 8:
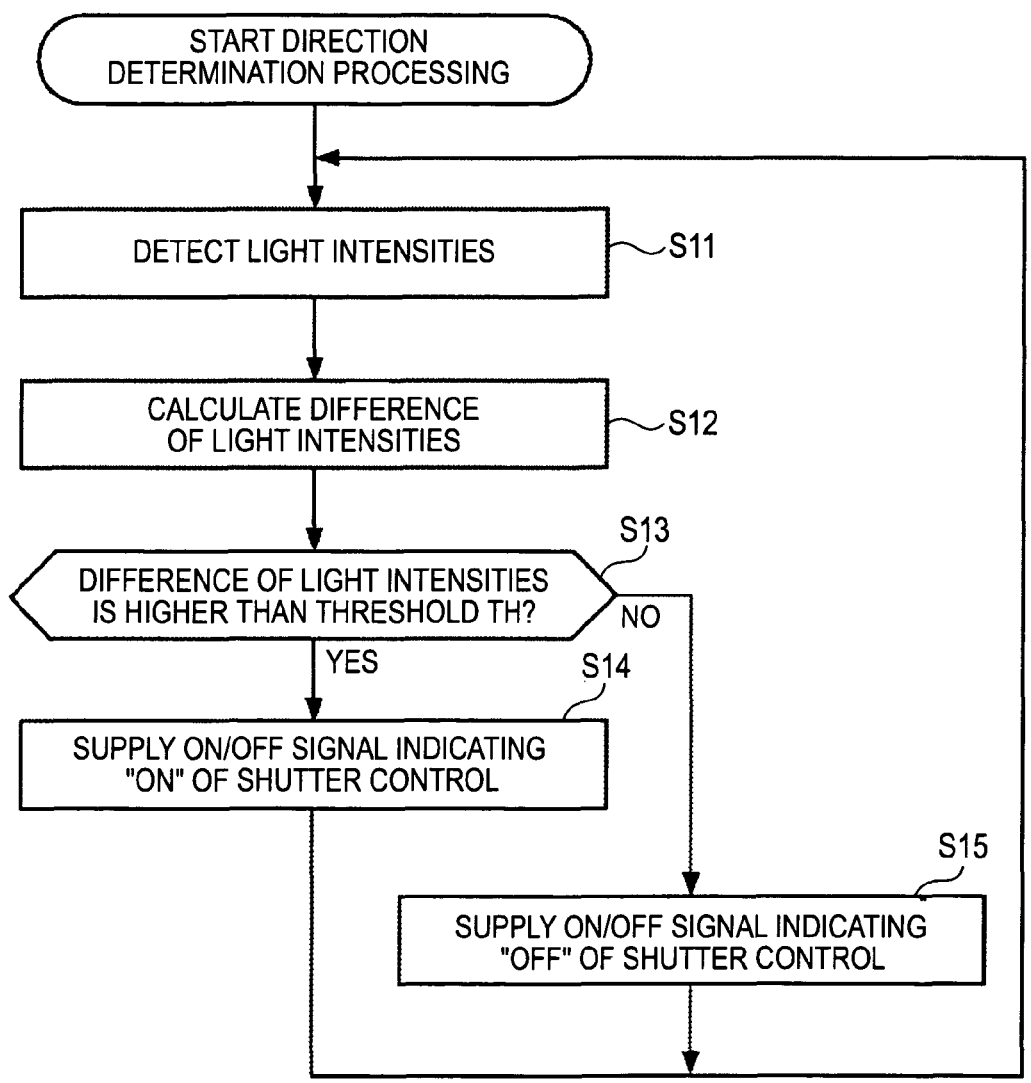
FIG. 8 is a flowchart for explaining direction determination processing.

FIG. 8 shows a flowchart of direction determination processing by the direction determination unit 54. The processing is executed in parallel to the shutter control processing of FIG. 7.

First, in Step S11, the first polarized light detection unit 61 and the second polarized light detection unit 62 detects light intensities respectively and converts these intensities into electrical signals, then, supplies the signals to the comparison determination unit 63. That is, the first polarized light detection unit 61 detects light intensity of the polarized component parallel to the polarized direction of display light and supplies the electrical signal corresponding the light intensity to the comparison determination unit 63. The second polarized light detection unit 62 detects light intensity of the polarized component vertical to the polarized direction of the display light and supplies the electrical signal corresponding to the light intensity to the comparison determination unit 63.

In Step S12, the comparison determination unit 63 calculates the difference of light intensities supplied from the first polarized light detection unit 61 and the second polarized light detection unit 62. Then, in Step S13, the comparison determination unit 63 determines whether the difference of light intensities is higher than the previously set threshold TH or not.

When it is determined that the difference of light intensities is higher than the threshold TH in Step S13, the processing proceeds to Step S14 and the comparison determination unit 63 supplies the on/off signal indicating ON of shutter control to the control unit 52.

On the other hand, when it is determined that the difference of light intensities is lower than the threshold TH, the processing proceeds to Step S15 and the comparison determination unit 63 supplies the on/off signal indicating OFF of shutter control to the control unit 52.

After Step S14 or Step S15, the process returns to Step S11 and processing after that is repeatedly executed.

The correspondence of the above shutter control processing and direction determination processing with operations of the user wearing the shutter glasses 23 is as follows.

When the user views 3D video displayed in the liquid crystal display 21, the shutter glasses 23 face the direction of the liquid crystal display 21. In this case, the difference of light intensities supplied from the first polarized light detection unit 61 and the second polarized light detection unit 62 is higher than the threshold TH. As a result, the shutter glasses 23 execute operations of opening the shutter for the left eye 33L as well as closing the shutter for the right eye 33R and operations of closing the shutter for the left eye 33L as well as opening the shutter for the right eye 33R continuously based on the timing signal supplied from the transmitting device 22.

On the other hand, when the user performs operations such that the user turns his/her face downward for operating a remote controller in hand or that the user turns his/her face away from the liquid crystal display 21 for talking with a person sitting next to him/her, light intensity of the display light component detected by the first polarized light detection unit 61 is reduced. Then, when the difference of light intensities supplied from the first polarized light detection unit 61 and the second polarized light detection unit 62 becomes lower than the threshold TH, the on/off signal indicating OFF of shutter control is supplied from the comparison determination unit 63 to the control unit 52. As a result, the drive signal is not supplied from the control unit 52 to the shutter drive unit 53, and both the shutter for the left eye 33L and the shutter for the right eye 33R are in the open state.

In the 3D video viewing system 11, when the user views 3D video displayed on the liquid crystal display 21, light transmittance as the whole shutter glasses 23 will be approximately 30% in the same manner as the state explained in the column of "Description of related art".

On the other hand, when the user turns his/her face away from the liquid crystal display 21, both the shutter for the left eye 33L and the shutter for the right eye 33R are in the open state. As light transmittances of respective shutter for the left eye 33L and the shutter for the right eye 33R are approximately 30%, the light transmittance of the whole shutter glasses 23 is also approximately 30%. Therefore, the light transmittance will be the same when the user views 3D video displayed on the liquid crystal display 21 and when the user does not view the video. That is, darkness in visual range obtained when seeing space outside the display screen of the liquid crystal display 21 during viewing of 3D video is reduced.

When the user turns his/her face away from the liquid crystal display 21, the shutter glasses 23 stop driving of liquid crystal shutters, which contributes also to reduction of power consumption. In other words, duration of a battery used as a power source can be extended.

In the above embodiment, the case in which the display on which 3D video is displayed is the liquid crystal display has been explained, however, the invention can be applied to displays other than the liquid crystal display as long as they are displays outputting display light of linear polarized light.

In the above embodiment, the explanation has been made under the condition that the liquid crystal display emits linear polarized light in the vertical direction, however, the linear polarized light emitted by the display is not limited to the vertical direction. That is, it is preferable that the shutter glasses according to the embodiment of the invention detect the intensity of light in the direction parallel to the linear polarized light emitted by the display.

In the specification, the system indicates the whole apparatus including plural devices.

The embodiment is not limited to the above embodiment and can be variously modified within a scope not departing from the gist thereof.

The present application contains subject matter related to that disclosed in Japanese Priority Patent Application JP 2009-187045 filed in the Japan Patent Office on Aug. 12, 2009, the entire contents of which is hereby incorporated by reference.

What is claimed is:

1. Shutter glasses for allowing a user to perceive 3D video comprising:
 a shutter for a right eye and a shutter for a left eye performing open and close operations of shutters in accordance with a timing signal synchronized with 2D video displayed on a display;
 a detection unit configured to detect light intensity of linear polarized light from a difference of light intensities of a first light intensity detector and a second light intensity detector;
 a shutter control unit configured to control the shutter for the right eye and the shutter for the left eye to perform open and close operations of the shutters in accordance with the timing signal based on the difference of light intensities compared to a given threshold;
 a first polarizing filter having a transmission axis parallel to a polarized direction of linear polarized light emitted from the display;
 the first light intensity detector being configured for detecting light intensity of light transmitted through the first polarizing filter;
 a second polarizing filter having a transmission axis vertical to the polarized direction of the linear polarized light emitted from the display; and
 the second light intensity detector being configured for detecting light intensity of light transmitted through the second polarizing filter,
 wherein upper portions as well as right and left portions in front of the first polarizing filter and the second polarizing filter are wall surfaces vertical to surfaces of the polarizing filters, and
 lower portions in front of the first polarizing filter and the second polarizing filter are inclined surfaces inclined downward at a given angle.

2. The shutter glasses according to claim 1, wherein the shutter control unit allows the shutter for the right eye and the shutter for the left eye to perform open and close operations of the shutters in accordance with the timing signal when the difference of light intensities is higher than a given threshold.

3. The shutter glasses according to claim 1, wherein the shutter control unit controls the shutter for the right eye and the shutter for the left eye to be in an open state when the difference of light intensities is lower than a given threshold.

4. The shutter glasses according to claim 1, wherein the detection unit further comprises:
 the first light intensity detector configured to detect a first light intensity including a non-polarized light intensity, and
 the second light intensity detector configured to detect a second light intensity including a polarized light intensity and the non-polarized light intensity, and
 a comparison unit configured to calculate the difference of the light intensities based on the first and second light intensities.

5. A display system for enabling the user to perceive the 3D video including the shutter glasses according to claim 1 and a transmitting device, the transmitting device providing the timing signal to the shutter glasses.

6. Shutter glasses comprising:
 a detection unit configured to detect light intensity of linear polarized light by detecting a difference between intensity of light transmitting through a first polarizing filter of the detection unit and intensity of light transmitting through a second polarizing filter of the detection unit; and
 a shutter control unit configured to control open and close operations of shutters based on an output signal, determined in accordance with the difference, from the detection unit and executes open and close operations of the shutters based on the output signal compared to a given threshold,
 a first accommodation unit configured to accommodate the light transmitting through the first polarizing filter, the first accommodation unit being configured on a display side of the first polarizing filter and to include first, second, and third surface portions vertical to a surface of the first polarizing filter and a fourth surface portion inclined at a given angle from the surface of the first polarizing filter; and
 a second accommodation unit configured to accommodate the light transmitting through the second polarizing filter, the second accommodation unit being configured on a display side of the second polarizing filter and to include first, second, and third surface portions vertical to a surface of the second polarizing filter and a fourth surface portion inclined at a given angle from the surface of the second polarizing filter.

7. The shutter glasses according to claim 6;
wherein the detection unit includes
the first polarizing filter having a transmission axis in a first direction, and
the second polarizing filter having a transmission axis in a second direction which is different from the first direction.

8. The shutter glasses according to claim 6,
wherein the shutter control unit executes open and close operations of shutters when the difference between intensity of light transmitting through the first polarizing filter and intensity of light transmitted through the second polarizing filter is higher than a given threshold.

9. The shutter glasses according to claim 6,
wherein the shutter control unit controls shutters to be in an open state when the difference between intensity of light transmitted through the first polarizing filter and intensity of light transmitted through the second polarizing filter is lower than a given threshold.

10. The shutter glasses according to claim 6, wherein the detection unit further comprises:
the first light intensity detector configured to detect a first light intensity including a non-polarized light intensity of light transmitting through the first polarizing filter, and
the second light intensity detector configured to detect a second light intensity including a polarized light intensity and the non-polarized light intensity of light transmitting through the second polarizing filter, and
a comparison unit configured to calculate the difference of the light intensities based on the first and second light intensities.

11. A display system for enabling a user to perceive 3D video including the shutter glasses according to claim 6 and a transmitting device, the transmitting device providing a timing signal to the shutter glasses that synchronizes the 3D video with the shutter glasses.

* * * * *